United States Patent [19]
Golner et al.

[11] Patent Number: 6,062,821
[45] Date of Patent: May 16, 2000

[54] INTEGRAL OIL FILTER-PUMP SYSTEM

[75] Inventors: Thomas M. Golner, Pewaukee; Shirish P. Mehta, Waukesha; Peter C. Michel, Muskego; Thomas Wanke, Menomonee Falls, all of Wis.

[73] Assignee: General Signal Corporation, Muskegon, Mich.

[21] Appl. No.: 09/172,383

[22] Filed: Oct. 14, 1998

[51] Int. Cl.[7] .................................................. F04B 49/00
[52] U.S. Cl. ........................ 417/12; 417/26; 417/313; 336/57
[58] Field of Search ........................ 417/12, 26, 44.1, 417/313; 336/57, 58

[56] References Cited

U.S. PATENT DOCUMENTS

| | | | |
|---|---|---|---|
| 1,978,856 | 10/1934 | Briggs | 210/131 |
| 4,053,398 | 10/1977 | Venema | 210/689 |
| 4,075,099 | 2/1978 | Pelton et al. . | |
| 4,139,464 | 2/1979 | Coward . | |
| 4,227,862 | 10/1980 | Andrew et al. | 417/12 |
| 4,586,875 | 5/1986 | Aman, Jr. | 417/228 |
| 4,861,467 | 8/1989 | Fukuhara . | |
| 5,069,780 | 12/1991 | Thalmann et al. . | |
| 5,232,588 | 8/1993 | Gryder . | |
| 5,399,073 | 3/1995 | Bauer | 417/313 |
| 5,613,843 | 3/1997 | Tsuru et al. | 417/313 |
| 5,691,706 | 11/1997 | Butler et al. . | |

*Primary Examiner*—Teresa Walberg
*Assistant Examiner*—Jeffrey Pwu
*Attorney, Agent, or Firm*—Ohlandt, Greeley, Ruggiero & Perle, L.L.P

[57] ABSTRACT

An integral oil filter-pump system for an electric power device which involves a cabinet having an oil-filled compartment for containing the power device, as well as a circulation pump for circulating oil through the system, including the compartment for containing the power device. Moreover, this unique system has an oil-filter unit, connected within the system, for removing contaminants and, notably, has the circulation pump contained within the oil-filled compartment

10 Claims, 2 Drawing Sheets

INTEGRAL OIL FILTER-PUMP SYSTEM

BACKGROUND OF THE INVENTION

The present invention generally relates to an oil filter-pump system for circulating oil through an electric power device such as a transformer load tap changer. The invention is particularly directed to apparatus that is useful for preventing environmental contamination resulting from the escape of dielectric insulation oil.

In the operation of certain electric power devices, such as transformers and the like, water droplets and graphite particles are inevitably entrained within the circulating oil used to cool such power devices. Oil circulation is necessary to reduce the temperatures that would otherwise be present. A standard practice is to connect the compartment in which the transformer load tap changer or the like is contained, and in which the cooling oil is present, to adjacently located pump and filter units by means of plumbing conduits. Circulation around the conduit loop is achieved by a pump motor which is controlled by a timer or timers and filter pressure differential monitoring switches.

A circulating oil system known in the art is found in U.S. Pat. No. 5,691,706, assigned to Filmax, Inc. This patent discloses an oil circulating system for a transformer including a load tap changer compartment connected by suction and discharge conduits to an area outside the compartment in which a filter and pump are located. The particular invention described therein is drawn to the objective of reducing or preventing leakage of oil from the transformer by giving an alarm of such leakage.

Another system in the prior art is one designed hereto fore by applicants' assignee, involving a circulating oil filter system but one which is typically add-on, rather than integral as is the case with the present invention. That prior cat design can be appreciated by reference to assignee's brochure OFS-G-1195A, published by Waukesha Electric Systems, Waukesha, Wis. 53186-5940.

Also known in the prior art is U.S. Pat. No. 4,075,099 assigned to Continental Group, Inc. which discloses a container assembly wherein the oil required for the changing of oil of a unit, such as an internal combustion engine, may be packed in a readily disposable container and wherein the container has built into it the usual filter so that in a simple operation both the filter and the old oil which contains contaminants, may be removed as a unit, whereby any oil lost in the filtering process due to adherence to the filter is completely replaced.

Although it will be clear that certain advantageous features are found in the systems of the prior art, nevertheless, there is a serious lack .n such systems inasmuch as the circulating pumps in the systems are susceptible to leakage with consequent damage to the local area and to the environment in general.

Accordingly, it is the primary object of the present invention to reduce substantially the leakage which occurs in an oil circulation system of the type described, that is, one which is directed to reducing the high temperatures normally produced in the operation of power devices such as large transformers and the like.

A related object is to insure that the motor and pump combination operate efficaciously, that is, the motor driving the pump is so coupled to the pump as to be capable of operating with only some slight amount of misalignment, the tolerable amount being achieved by an adapter means.

Other related objects are to insure that the most contaminated oil is removed first so that the greatest efficiency is achieved in contaminant removal.

Another object is to prevent loss of oil in the event of a break in the pick-up or return tubes by providing anti-siphon holes in such tube.

Yet another object is to monitor completely the operation of the system by providing a pressure release device, and pressure switches which incorporate both high and low pressure contacts, whereby if the pressure is too low a pump problem is indicated or an oil level problem. On the other hand, if the pressure is too high it indicates a plugged filter or other resistance to flow.

SUMMARY OF THE INVENTION

In fulfillment of the stated objects the primary feature of the present invention resides in the provision of having the circulation pump housed or contained within the oil-filled compartment in which the power device whose temperature is to be controlled is located. In contrast thereto, it will be appreciated from the prior art cited, particularly U.S. Pat. No. 5,691,706, that the particular type of an oil filter-pump system disclosed therein has the circulation pump for circulating oil through the system located in a compartment, along with a filter unit, which is at a lower elevation than the power device in the form of a load tap changer whose temperature is to be controlled. Such an arrangement is vulnerable to the possibility of a minor oil seal leak at the pump whereby substantial oil may leak from the pump; also because of the placement of parts the pump will tend to cavitate and not maintain positive pressure substantially all of the time.

This primary feature of the invention prevents the pump from cavitating and insures that it will maintain positive pressure at all times as contrasted with the situation that exists for the prior art systems.

In summary the present invention is defined broadly as follows: An integral oil filter-pump system for an electric power device comprising a cabinet having an oil-filled compartment for containing the power device. A circulation pump operates to pump circulating oil through the power device to pick-up contaminants produced by the power device. An oil filter unit is connected within the system to remove the contaminants. The key feature resides in the arrangement according to which the circulation pump is contained within the oil-filled compartment.

A further feature of the present invention resides in the arrangement of dry-break connectors attached to the manifold, and including the means for making it impossible to attach the filter unit to the manifold incorrectly. Such means may take the form of a design offset arrangement for the dry-break connectors.

Another feature involves having a pick-up tube through which oil is removed from the first compartment contained in the power device placed close to the bottom of the compartment thereby to remove the most contaminated oil first. Additionally, anti-siphon holes already mentioned are provided in such pick-up tube for preventing loss of oil as already noted.

Other and further objects, advantages and features of the present invention will be understood by reference to the following specification in conjunction with the annexed drawings, wherein like parts have been given like numbers.

DESCRIPTION OF PREFERRED EMBODIMENT

Figure 1:
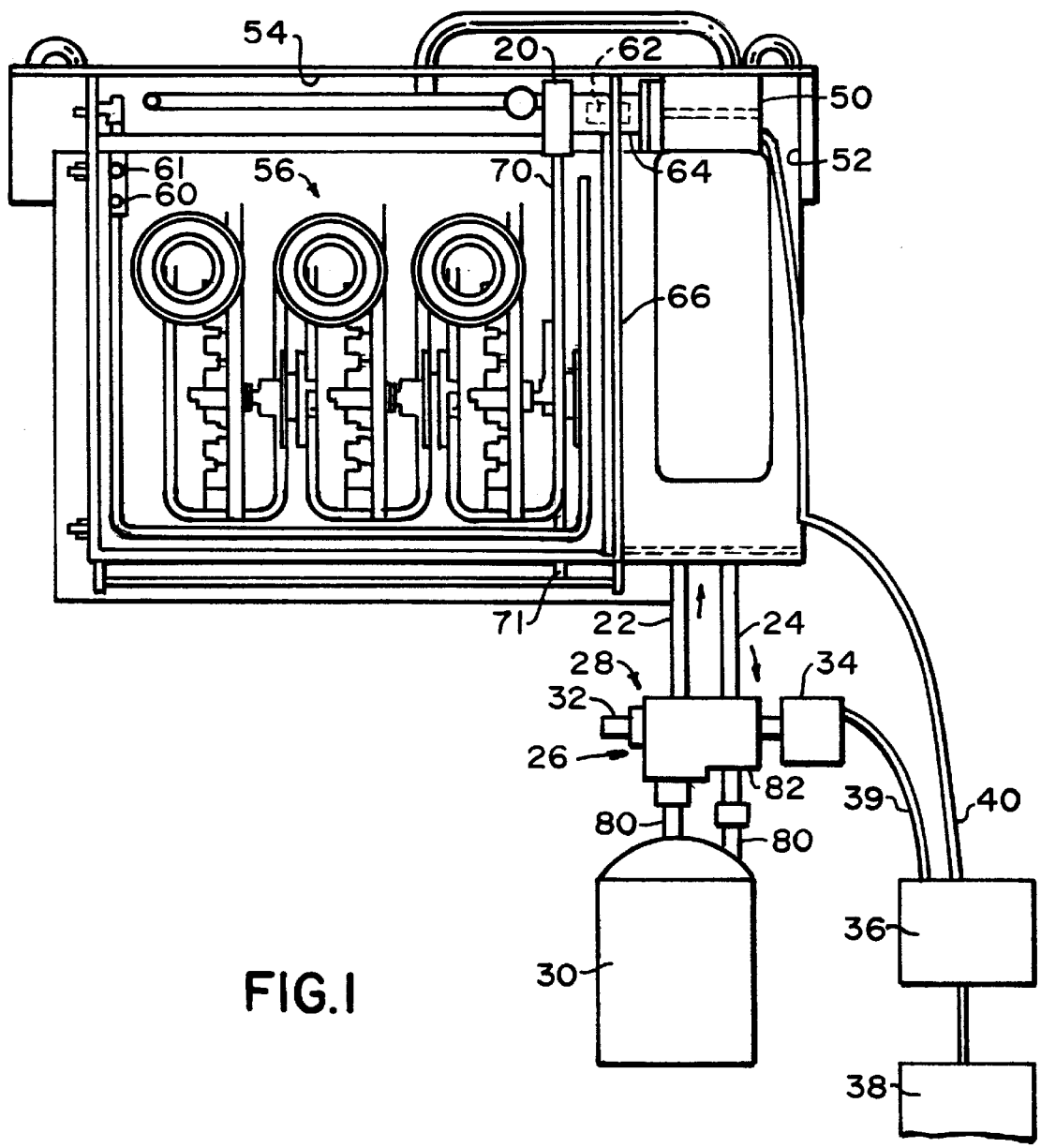
FIG. 1 is a schematic diagram of the oil filter-pump system of the present invention.

Referring now to the drawing, wherein like reference characters designate the same or similar elements it will be appreciated by reference to FIG. 1 how the unique integral oil filter-pump system of the present invention is realized. Said system involves a pump 20 which is assigned the task of pumping the circulating oil through the conduit or tubular loop, which includes a main inlet conduit or tube 22 and a main outlet tube 24 for the purpose of circulating the oil so that contaminants may be removed from the system by means of a filter unit 26 comprising a manifold 28 and a canister 30. A pressure relief means 32 is seen connected to the manifold 28, and both high and low pressure switches are included within the means 34. As a (consequence, means 34 enables responding to a variety of potential problems in the operation of the system as will be explained. Timer means 36 is connected by means of cable 39 to receive the output of the pressure switches in means 34.

For enabling oil circulation, electrical cable 40 is connected to a motor 50 for driving the pump 20. The motor is in an air-filled chamber 52 which is adjacent to an oil-filled compartment 54 in which a transformer load changer mechanism 56 is immersed in oil. Oil is discharged into the compartment 54 by means of a discharge tube or conduit 60, such tube 60 being connected to main discharge tube or conduit 22.

Figure 2:
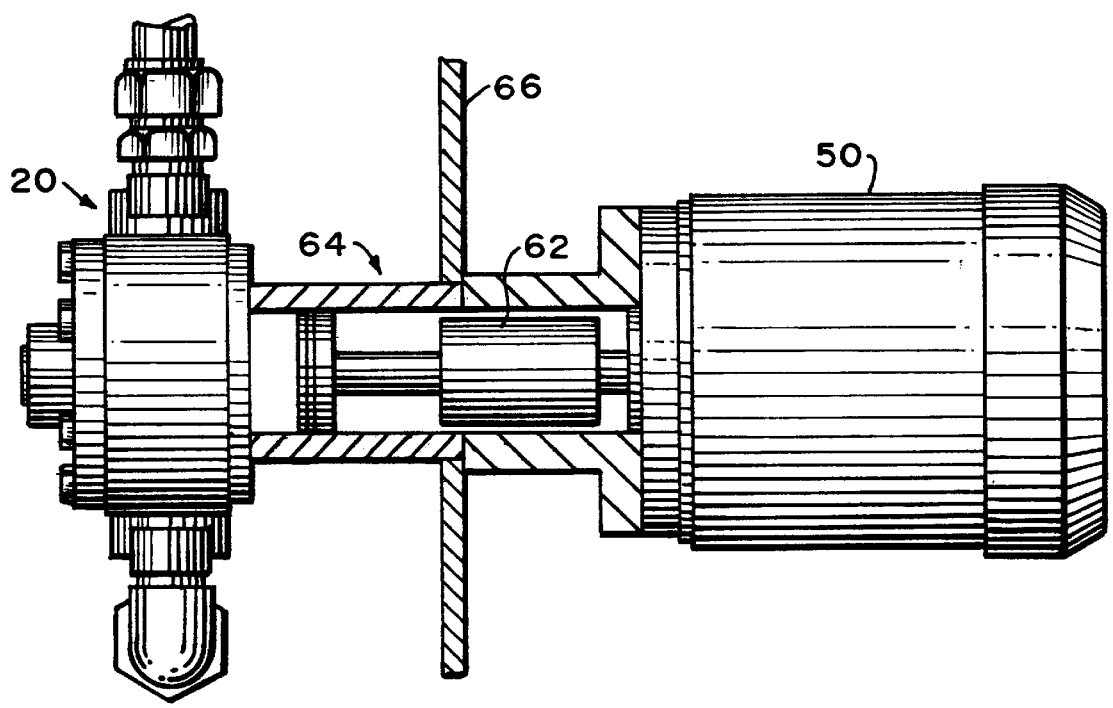
FIG. 2 is an elevation view illustrating the connection of the motor and pump by a coupler and adapter arrangement.

The motor 50 is connected to the pump 20 by means of a coupling 62 that is capable of operating with some amount of misalignment. An adapter 64 is welded to a plate 66 between the two compartments. This adapter is so designed, as will be seen in FIG. 2, that it is capable of minimizing misalignment between the pump 20 and the motor 50.

It will be especially noted that the pump 20 is located in the oil chamber 54 so that in the event of a minor seal leak, no oil will escape from the system. Also advantageously, with this particular pump, the pump will not cavitate, but will maintain positive pressure at all times. It should also be noted that a pick-up tube 70 is brought close to the bottom of the oil compartment so as to remove the most contaminated oil first. The oil picked up is carried through the loop to outlet tube 24. The pick-up tube 70, as well as the return tube 60, are each provided with anti-siphon holes 61 and 71, respectively.

In the operation of the system, the pressure switches within the means 34 function by reason of both high and low pressure contacts. If the pressure is too low it indicates a pump problem. If the pressure is too high, it indicates a plugged filter. The consequence of the inclusion of the timer means 36 in the system flows from the fact that this timer means incorporates appropriate time delays and includes switches whereby the pump operation can be completely controlled, such that, for example, in the event of excessively high or low pressure, the motor will either be shut-off immediately or with a suitable time delay to make certain that the pressure never becomes too high or too low. Shut-off is accomplished by the timer means 36, which is connected to the power source 38.

Reference to FIG. 3, in which one of the dry-break connectors is shown, will make it clear how the pair of connectors eliminate all leakage and spills during filter unit changes. The filter unit 30 is supplied pre-filled with oil such that additional make-up oil is not needed. These dry-break connectors 80 have respectively lengths and are so attached to manifold 28,—which has a designed shoulder or offset 82 as will be appreciated from FIG. 3—that it is impossible to attach filter unit to the manifold incorrectly. It will be apparent that once the oil has passed through the unit 30 it returns to the loop by way of the manifold and the oil return conduit 22.

What has been disclosed herein is an inventive scheme whose primary object is to insure that in the event of a seal leak, no oil will escape from the system, and that this objective is achieved by having a circulating oil system in which the pump is located in the oil-filled chamber in which an electrical power device to be cooled is disposed.

The invention having been thus described with particular reference to the preferred forms thereof, it will be obvious that various changes and modifications may be made therein without departing from the spirit and scope of the invention as defined in the appended claims.

We claim:

1. An integral oil filter-pump system for an electric power device comprising:
   a cabinet having an oil-filled compartment for containing the power device;
   a circulation pump for circulating oil through the system including the compartment for containing the power device;
   an oil filter unit connected within the system;
   wherein the circulation pump is contained within the oil-filled compartment.

2. A system as defined in claim 1, further including suction and discharge conduits connected to said circulation pump.

3. A system as defined in claim 1, further including a motor for driving the circulation pump, said motor located in another compartment adjacent to the first compartment, and means for coupling said motor to said pump.

4. A system as defined in claim 3, in which the electric power device is a load tap changer.

5. A system as defined in claim 4, further comprising an adapter between the two compartments, the adapter functioning to minimize the misalignment that would otherwise occur between the pump and the motor for driving the pump.

6. A system as defined in claim 5, in which a manifold is coupled to the section and discharge conduits and a pressure relief valve is coupled to said manifold.

7. A system as defined in claim 6, further including dry-break connectors for connecting the conduits to the oil filter unit.

8. A system as defined in claim 7, further comprising timer and pressure sensing devices, the output of the pressure switches being transmitted to the timer which incorporates time delays, and additional switches to control the pump motor.

9. A system as defined in claim 8, further comprising a filter unit which is filled with oil such that the filter unit can replace the previously used unit without the need for make-up oil to be supplied to the system.

10. A system as defined in claim 9, in which the dry-break connectors are attached to the manifold with an offset such that it is impossible to attach the filter unit to the manifold incorrectly.

* * * * *